(12) United States Patent
Chatterjee et al.

(10) Patent No.: US 9,002,794 B1
(45) Date of Patent: Apr. 7, 2015

(54) RECLAIMING SPACE FROM A FILE SYSTEM

(71) Applicant: American Megatrends, Inc., Norcross, GA (US)

(72) Inventors: Paresh Chatterjee, Fremont, CA (US); Vijayarankan Muthirisavenugopal, Newark, CA (US); Raghavan Sowrirajan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/960,687

(22) Filed: Aug. 6, 2013

Related U.S. Application Data

(63) Continuation of application No. 12/702,824, filed on Feb. 9, 2010, now Pat. No. 8,504,524.

(60) Provisional application No. 61/150,965, filed on Feb. 9, 2009.

(51) Int. Cl.
  *G06F 17/00* (2006.01)
  *G06F 7/00* (2006.01)
  *G06F 17/30* (2006.01)

(52) U.S. Cl.
  CPC ................ *G06F 17/30088* (2013.01)

(58) Field of Classification Search
  CPC ............ G06F 12/0253; G06F 9/45533; G06F 3/0652; G06F 3/0608
  USPC .................... 707/639; 711/112, 173
  See application file for complete search history.

(56) References Cited

U.S. PATENT DOCUMENTS

| | | | |
|---|---|---|---|
| 5,920,873 A * | 7/1999 | Van Huben et al. | ... 707/999.201 |
| 6,237,060 B1 | 5/2001 | Shilts et al. | |
| 6,898,611 B1 | 5/2005 | Dussud et al. | |
| 6,981,116 B2 | 12/2005 | Jolly | |
| 7,254,682 B1 * | 8/2007 | Arbon | 711/161 |
| 7,509,454 B2 | 3/2009 | Kano | |
| 7,603,532 B2 * | 10/2009 | Rajan et al. | 711/166 |
| 7,702,662 B2 * | 4/2010 | Adkins et al. | 707/822 |
| 7,882,067 B2 * | 2/2011 | Saika | 707/639 |
| 2003/0172226 A1 | 9/2003 | Jolly | |
| 2004/0230766 A1 * | 11/2004 | Cameron | 711/203 |
| 2005/0021565 A1 * | 1/2005 | Kapoor et al. | 707/200 |
| 2006/0085471 A1 | 4/2006 | Rajan et al. | |
| 2006/0253670 A1 * | 11/2006 | Zohar et al. | 711/162 |
| 2006/0253681 A1 * | 11/2006 | Zohar et al. | 711/172 |
| 2009/0089516 A1 | 4/2009 | Pelts et al. | |
| 2010/0042802 A1 * | 2/2010 | Helman et al. | 711/173 |
| 2010/0241820 A1 | 9/2010 | Pelts et al. | |
| 2011/0153977 A1 * | 6/2011 | Root et al. | 711/171 |

* cited by examiner

*Primary Examiner* — Pavan Mamillapalli
(74) *Attorney, Agent, or Firm* — Meunier Carlin & Curfman, LLC

(57) ABSTRACT

Technologies are provided for reclaiming a file system coupled to a block device. In these technologies, a dummy file is created. The dummy file is expanded to fill a volume in the block device. A mapping of the dummy file to locations in the volume is retrieved. When the mapping of the dummy file to the locations in the volume is retrieved, corresponding space in the volume is reclaimed. This space may include the locations in the volume corresponding to the mapping of the dummy file. When this space in the volume is reclaimed, the dummy file is deleted.

20 Claims, 9 Drawing Sheets

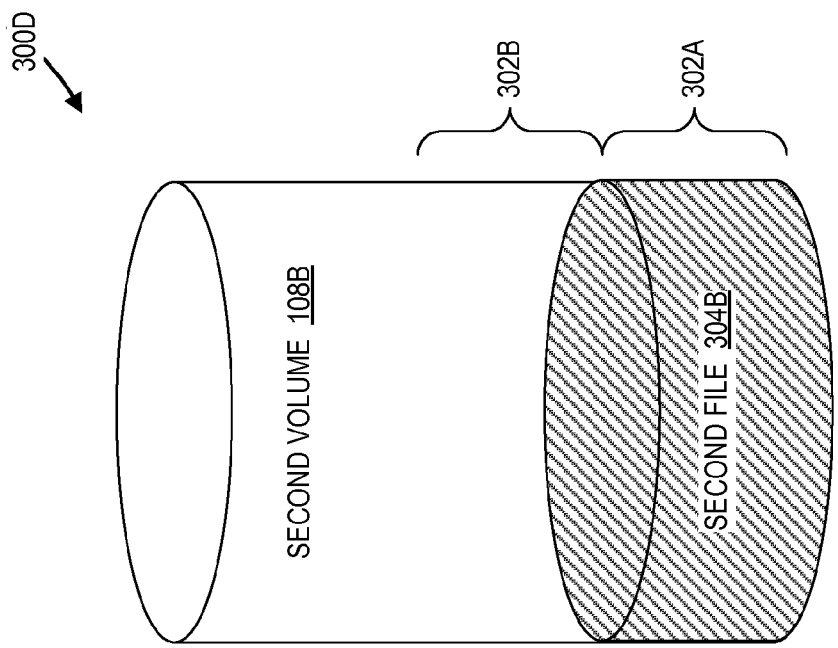
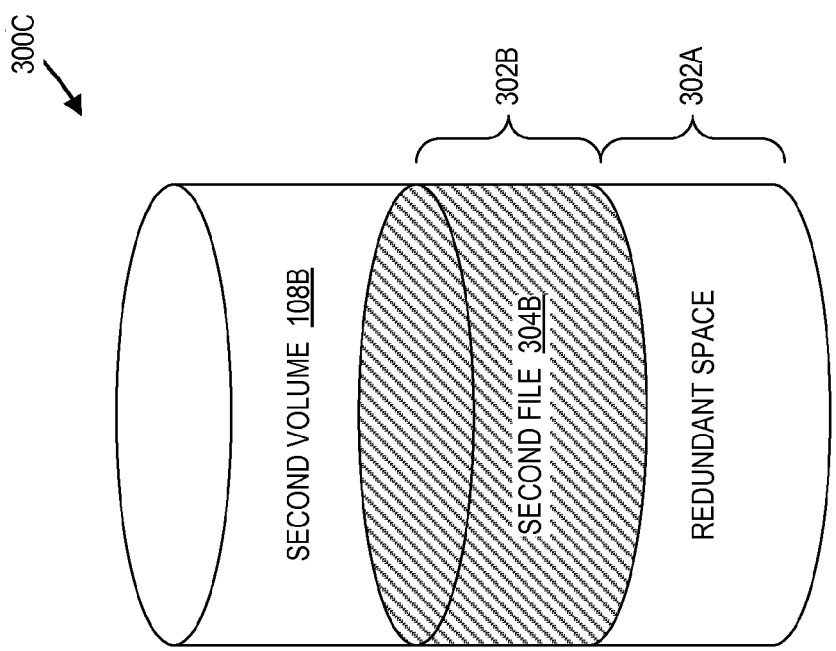

US 9,002,794 B1

RECLAIMING SPACE FROM A FILE SYSTEM

CROSS-REFERENCE TO RELATED APPLICATIONS

This application is a continuation of U.S. patent application Ser. No. 12/702,824, filed on Feb. 9, 2010, issued as U.S. Pat. No. 8,504,524 on Aug. 6, 2013, entitled "RECLAIMING SPACE FROM A FILE SYSTEM", and claims the benefit of U.S. Provisional Patent Application No. 61/150,965, filed on Feb. 9, 2009, the disclosures of which are expressly incorporated herein by reference in their entireties.

BACKGROUND

Generally, a file system provides a mechanism for storing and organizing files in such a way that the files can be efficiently and effectively retrieved. A file system may exist on top of a block device, which provides a storage medium for storing the data. In some cases, the block device may include one or more logical devices (i.e., volumes), each of which is abstracted from multiple physical data storage devices. The system may provide a level of abstraction between applications and end users accessing the data and the block devices storing the data. Although only one file system may exist on a given block device, each file system may reside over one or more block devices.

When a file is created, the file system may reserve space for the file on the underlying block device and utilize the reserved space to store the data being written to the file. As the amount of data being written to the block device increases, the file system may reserve and utilize more space from unused regions of the block device. When a file is deleted from the block device, the file system may mark the regions that were utilized by the file as free.

In some implementations of the file system, the recently freed space in the underlying block device may be wasted. In a first implementation where the file system is a thin provisioned system, a greater amount of space may be "advertised" to applications and end users versus the amount of space that is actually available. While thin provisioning may yield a greater percentage of storage utilization, one drawback is that the file system may not efficiently utilize free space in the block device after files have been deleted. For example, as previously described, when a file is deleted from the block device, the file system may mark regions that were utilized by the file as free. However, in a thin provisioned system, when a new file is created, the file system may not write the new file in the previously utilized regions that are now free. Instead, the thin provisioned system may attempt to write the new file in newer regions of the block device that have not been previously utilized in order to avoid fragmentation. If these newer regions are not available, especially if multiple file systems access a given block device, then the file system may receive out-of-space errors.

In a second implementation where the file system takes a snapshot (i.e., point-in-time image) of the underlying volume, the file system may "freeze" the region taken by the snapshot, thereby preventing any new writes to the region, until the corresponding snapshot is deleted. Thus, if the snapshot includes freed space, the file system may unnecessarily freeze the freed space. For example, a volume may store a file that is subsequently deleted. The file system may then take a snapshot of the volume, which includes the region previously occupied by the file, and freeze the volume. When a new file is created, the file system may attempt to write the new file to newer regions of the volume because the previously utilized region contained in the snapshot has been. Thus, the previously utilized region becomes redundant space in the volume.

In a third implementation where the file system takes a snapshot of the underlying volume, new writes that are less than a block size of the block device may require a read-modify-write operation. In the read-modify-write operation, part of the data is read from the snapshot space and, along with the new data, is written to the underlying volume. When a file stored in a given block is deleted, new writes to the block may unnecessarily require the read-modify-write operation, thereby negatively affecting snapshot performance.

In these example implementations and others, the file system unnecessarily wastes space in the underlying volume. By reclaiming this wasted space, the file system may avoid out-of-space errors and eliminate redundant space in the underlying volume.

It is with respect to these and other considerations that the disclosure made herein is presented.

SUMMARY

Technologies are described herein for reclaiming space in a file system. Embodiments are provided for reclaiming space in a thin-provisioning system. Additional embodiments are provided for eliminating redundant snapshot space. Further embodiments are provided for improving snapshot performance.

According to one aspect presented herein, technologies are provided for reclaiming a file system coupled to a block device. In these technologies, a dummy file is created. The dummy file is expanded to fill a volume in the block device. A mapping of the dummy file to locations in the volume is retrieved. When the mapping of the dummy file to the locations in the volume is retrieved, corresponding space in the volume is reclaimed. This space may include the locations in the volume corresponding to the mapping of the dummy file. When this space in the volume is reclaimed, the dummy file is deleted.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3D are diagrams of a second volume coupled to the file system, in accordance with some embodiments;

DETAILED DESCRIPTION

Figure 1:
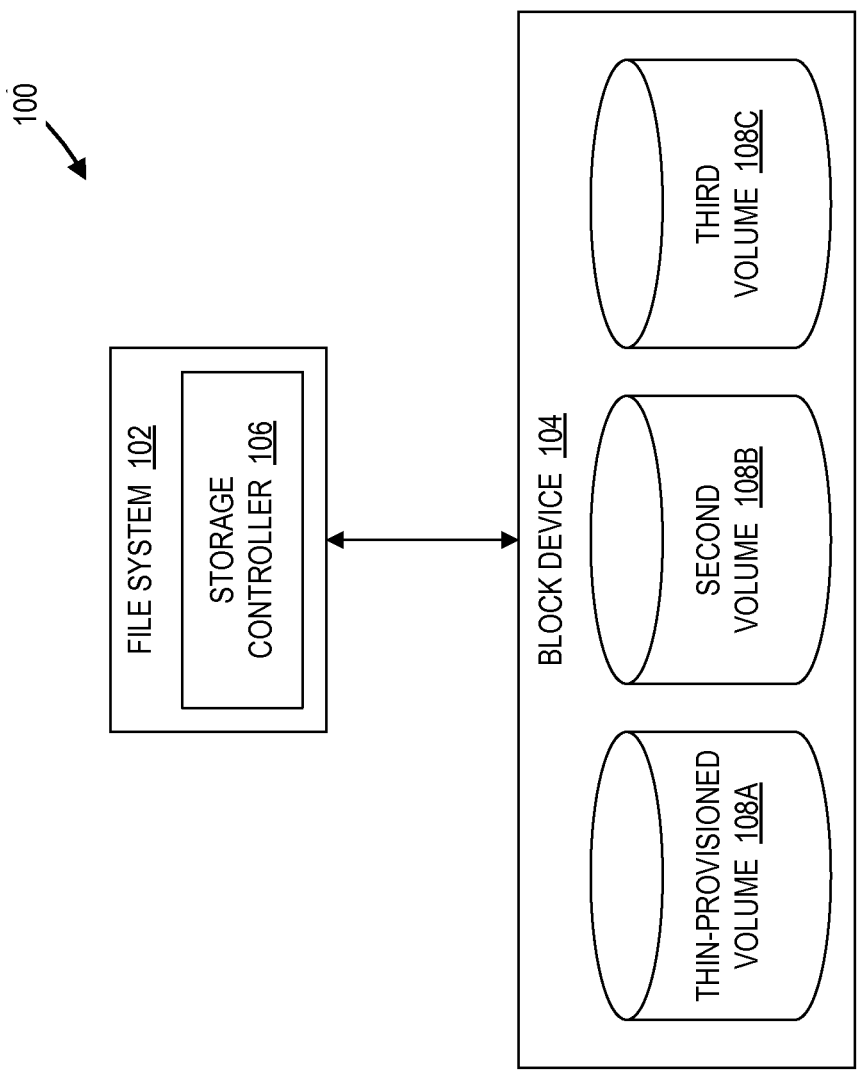
FIG. 1 is an illustrative architecture diagram of a storage system configured to reclaim space from a file system, in accordance with some embodiments.

The following detailed description is directed to technologies for reclaiming space from a file system, in accordance with some embodiments. As used herein, a "snapshot" refers to an image of a given data volume at a particular point in time. In an example implementation, a storage replication solution may take a snapshot of a first data volume. Upon taking the snapshot, the storage replication solution may transfer the snapshot to a second data volume over a network. The storage replication solution may then write the snapshot into the second data volume, thereby replicating the snapshot. Upon writing the snapshot into the second data volume, the storage replication solution may take an additional snapshot of the second data volume. The storage replication solution can then transfer the additional snapshot to a third data volume. This snapshot replication solution can continue for additional data volumes as desired.

The storage replication solution may take multiple snapshots of the first data volume at a predefined schedule or under the direction of an administrator. The storage replication solution may then replicate the snapshots through synchronous or asynchronous replication. In the event of a disaster that corrupts the first data volume, the administrator can restore the first data volume based on at least one of the replicated snapshots. A greater number of replicated snapshots may provide a greater number of recovery points (also referred to as consistency points) from which the administrator can restore the first data volume.

In some implementations, the storage replication solution may implement snapshot-assisted replication. In snapshot-assisted replication, the storage replication solution may generate an initial snapshot of the first data volume and replicate the initial snapshot on the second data volume. When the storage replication solution generates each additional snapshot following the initial snapshot, the storage replication solution does not replicate the entire additional snapshot on the second data volume. Instead, the storage replication solution replicates only delta data (i.e., the block-level differences) between each additional snapshot and the immediate preceding snapshot. Thus, the delta data may include new data and modified data, but might not include old data that remains the same. By implementing snapshot-assisted replication, the storage replication solution can significantly reduce the amount of data that needs to be replicated.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, FIG. 1 shows an illustrative architecture diagram of a storage system 100 configured to reclaim space from a file system. The storage system 100 includes a file system 102 coupled to a block device 104. In other embodiments, multiple file systems may be coupled to the block device 104. The file system 102 may include a storage controller 106. The block device 104 may include a plurality of volumes, including a thin-provisioned volume 108A, a second volume 108B, and a third volume 108C (collectively referred to as volumes 108). The volumes 108 may be adapted to store files and other data. According to some embodiments, the storage controller 106 may be configured to identify space occupied by a deleted file and reclaim the identified space. The operation of the storage controller 106 will be described in greater detail below with respect to FIGS. 2A-2D, 3A-3D, and 4A-4C.

Figure 2B:
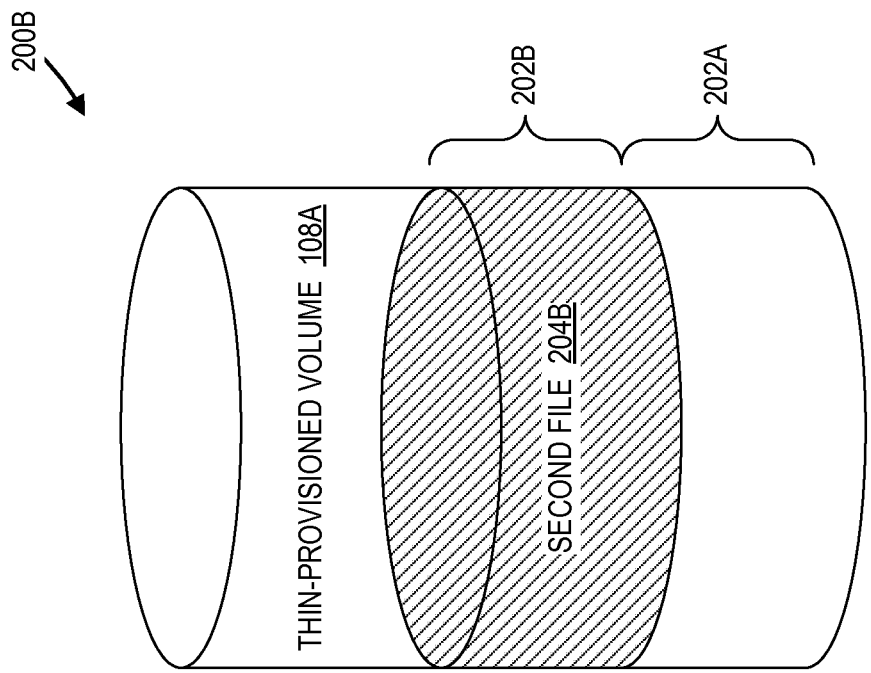
FIGS. 2A-2D are diagrams of a thin-provisioned volume coupled to the file system, in accordance with some embodiments.
Figure 2A:
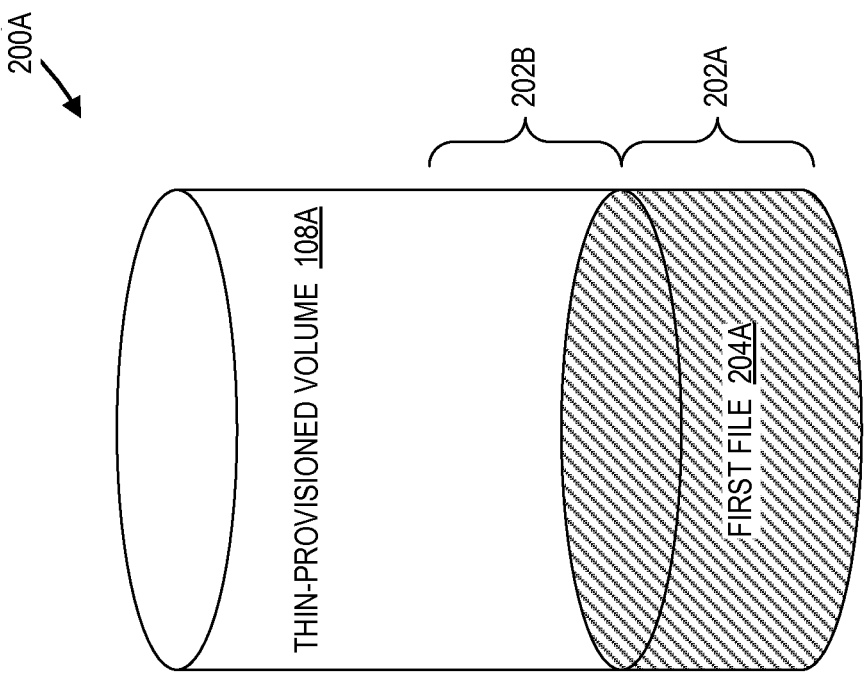

Referring now to FIG. 2A, a diagram 200A shows the thin-provisioned volume 108A after a first file 204A has been written to the thin-provisioned volume 108A. The thin provisioned volume 108A includes a first region 202A and a second region 202B. In an illustrative example, the first region 202A and the second region 202B begin empty and have not been occupied by a file. The storage controller 106 then reserves the first region 202A and writes the first file 204A to the first region 202A. It will be appreciated that the terms "region," "physical space," and "block" may be utilized interchangeably in the present disclosure.

Referring now to FIG. 2B, a diagram 200B shows the thin-provisioned volume 108A after the first file 204A has been deleted and a second file 204B has been written to the thin-provisioned volume 108A. Continuing the illustrative example described above with reference to FIG. 2A, the first region 202A stores the first file 204A, and the second region 202B is empty and has not been occupied by a file. When the storage controller 106 deletes the first file 204A from the first region 202A, the storage controller 106 marks the first region 202A as free. However, in conventional implementations, when the second file 204B is created, the storage controller 106 may reserve a newer region, such as the second region 202B, that has not previously stored files in order to avoid fragmentation. As a result, the older regions, such as the first region 202A, that were freed due to file deletion may be wasted. Further, in some cases, the second region 202B, although "advertised" by the thin-provisioned volume 108A, may not actually be available in the thin provisioned volume 108A. In such cases, the storage controller 106 may receive an out-of-space error.

Figure 2D:
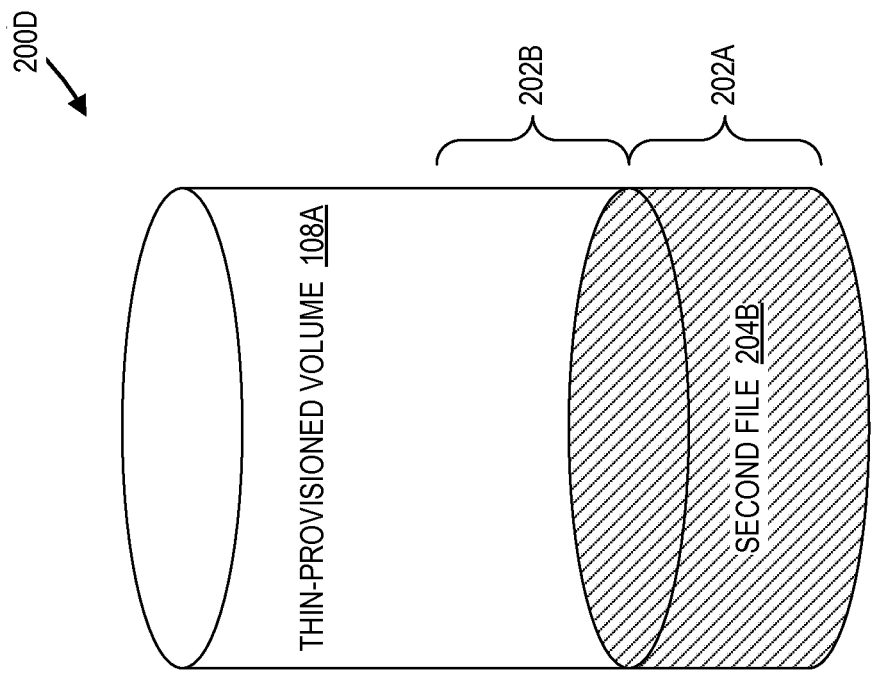
Figure 2C:
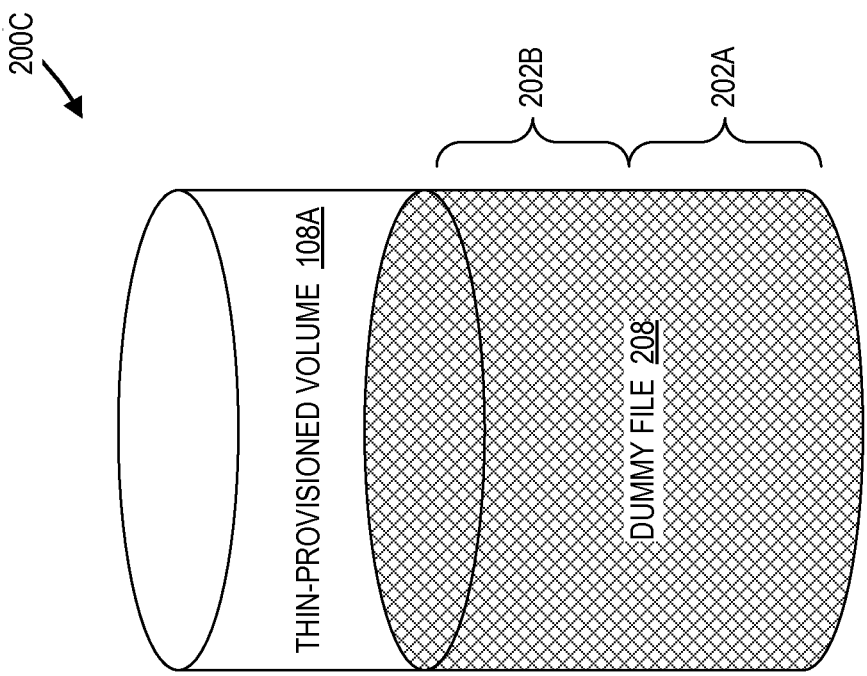

Referring now to FIG. 2C, a diagram 200C shows the thin-provisioned volume 108A after the first file 204A has been deleted and the first region 202A is reclaimed. According to some embodiments, the storage controller 106 creates a large dummy file 208 in the thin-provisioned volume 108A and expands the large dummy file 208, as necessary, to fill the entire or near the entire thin-provisioned volume 108A. For example, the large dummy file 208 may fill the first region 202A and the second region 202B. In other embodiments, the first region 202A and the second region 202B may be non-contiguous. In such embodiments, the dummy file 208 may occupy non-contiguous regions.

It will be appreciated the large dummy file 208 does not need to be written to the thin-provisioned volume 108A. In particular, the file system 102 may provide a mechanism to reserve space (i.e., expand the file) in the thin-provisioned volume 108A for the large dummy file 208 without having to write to the large dummy file 208 to the thin-provisioned volume 108A. In some other embodiments, the large dummy file 208 may be written to the thin-provisioned volume 108A.

When the entire or near the entire thin-provisioned volume 108A has been filled with the large dummy file 208, the storage controller 106 may identify the physical regions in the thin-provisioned volume 108A that are occupied by the large dummy file 208. For example, certain file systems, such as the XFS file system from SILICON GRAPHICS, INC. and other suitable LINUX-based file systems, may provide a mapping of the physical regions of a volume that are occupied by a file, such as the large dummy file 208. By identifying the physical regions in the thin-provisioned volume 108A that are occupied by the large dummy file 208 in this manner, the storage controller 106 can also reclaim any space in the thin-provisioned volume 108A that has been freed by the deletion of files. The storage controller 106 can then delete the large dummy file 208 (i.e., unreserved the space in the thin-provisioned volume 108A that was reserved for the large dummy file 208). When new files are subsequently created, the storage controller 106 can reserve and utilize the physical regions identified through the large dummy file 208 to store the new files.

Referring now to FIG. 2D, a diagram 200D shows the thin-provisioned volume 108A after the first region 202A has been reclaimed and a second file 204B has been written to the thin-provisioned volume 108A. Continuing the illustrative example described above with reference to FIG. 2A, the first region 202A stores the first file 204A, and the second region 202B is empty and has not been occupied by a file. When the storage controller 106 deletes the first file 204A from the first region 202A, the storage controller 106 may mark the first region 202A as free. The storage controller 106 then creates the large dummy file 208 in the thin-provisioned volume 108A and expands the large dummy file 208 (i.e., reserves space in the thin-provisioned volume 108A), as necessary, to fill the entire or near the entire thin-provisioned volume 108A.

In this example, the storage controller 106 may determine that the large dummy file 208 occupies at least the first region 202A and the second region 202B. Having identified that the first region 202A is available, the storage controller 106 may then delete the large dummy file 208 from the thin-provisioned volume 108A. When the second file 204B is created, the storage controller 106 may reserve the first region 202A and write the second file 204B to the first region 202A. In further embodiments, the storage controller 106 may release the first region 202A for other volumes in the block device 104.

Figure 3B:
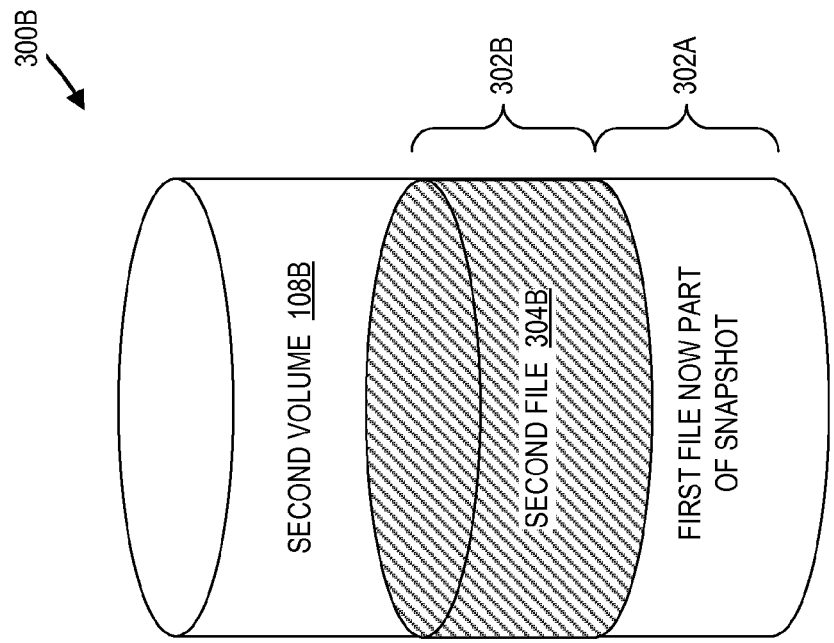
Figure 3A:
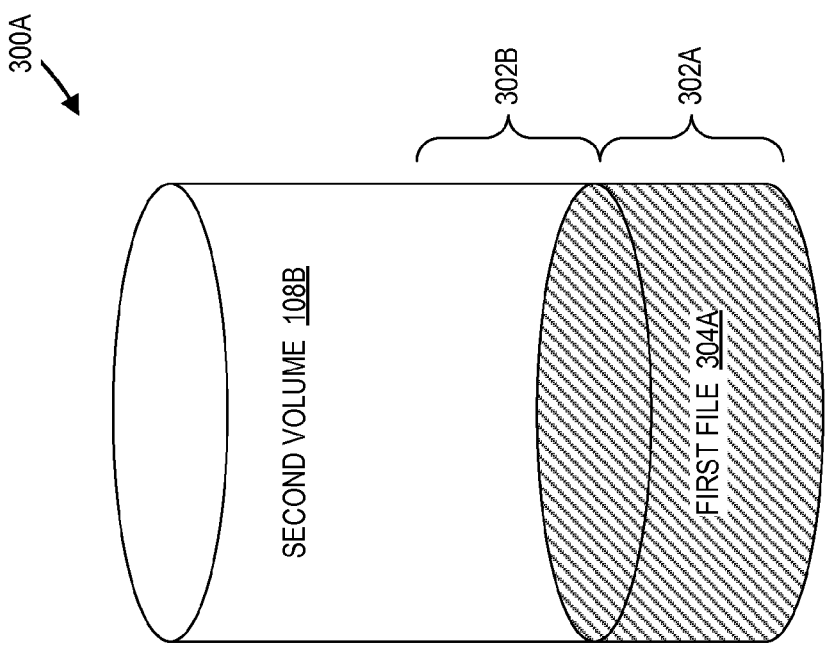

Referring now to FIG. 3A, a diagram 300A shows the second volume 108B after a first file 304A has been written to the second volume 108B and a snapshot of the second volume 108B has been taken. The second volume 108B includes a first physical space 302A and a second physical space 302B. In an illustrative example, the storage controller 106 reserves the first physical space 302A and writes the first file 304A to the first physical space 302A. The storage controller 106 then takes a snapshot (not shown) of the second volume 108B.

Referring now to FIG. 3B, a diagram 300B shows the second volume 108B after the first file 304A has been deleted and a second file 304B has been written to the second volume 108B. Continuing the illustrative example described above with reference to FIG. 3A, the first file 304A is deleted after the snapshot of the second volume 108B has been taken. The snapshot constitutes the first physical space 302A reserved for the first file 304A, thereby ensuring that the first file 304A is preserved. Thus, when the second file 304B is created, the storage controller 106 allocates a new physical space, such as the second physical space 302B, reserves the second physical space 302B, and writes the second file 304B to the second physical space 302B.

Referring now to FIG. 3C, a diagram 300C shows the second volume 108B after the first file 304A (not shown in FIG. 3C) has been deleted, a snapshot of the second volume 108B has been taken, and the second file 304B has been written to the second volume 108B. In an illustrative example, the storage controller 106 writes the first file 304A to the first physical space 302A. Prior to taking the snapshot of the second volume 108B, the storage controller 106 deletes the first file 304A. When the storage controller 106 deletes the first file 304A, the first physical space 302A becomes eligible for reuse. However, in this example, the storage controller 106 takes the snapshot of the second volume 108B before the first physical space 302A is reused and thereby freezes the first physical space 302A reserved for the first file 304A.

When the second file 304B is created, the storage controller 106 allocates a new physical space, such as the second physical space 302B, reserves the second physical space 302B, and writes the second file 304B to the second volume 108B at the second physical space 302B. Since the second physical space 302B is utilized the store the second file 304B, the first physical space 302A becomes redundant.

Referring now to FIG. 3D, shows the second volume 108B when the first physical space 302A is reclaimed before the snapshot of the second volume 108B is taken. In the illustrative example described above with reference to FIG. 3C, the storage controller 106 writes the first file 304A to the first physical space 302A. Prior to taking the snapshot of the second volume 108B, the storage controller 106 deletes the first file 304A. In this example, the storage controller 106 then reclaims the first physical space 302A. For example, the storage controller 106 may reclaim the first physical space 302A by utilizing the dummy file 208 as described in greater detail above with reference to FIG. 2C.

Accordingly, when the storage controller 106 takes the snapshot of the second volume 108B, the storage controller 106 knows that the first physical space 302A is deleted space and not reserved for the first file 304A. As a result, the first physical space 302A is not utilized for the snapshot. When the second file 304B is created, the storage controller 106 may reserve the first physical space 302A because the first physical space 302A has not been frozen. The storage controller 106 then writes the second file 304B to the first physical space 302A.

Figure 4B:
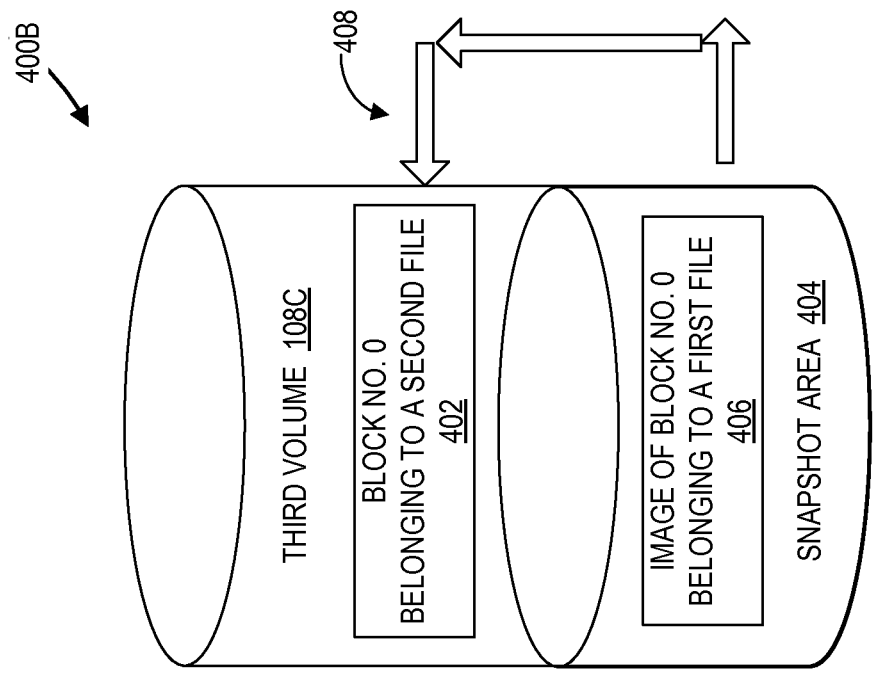
FIGS. 4A-4C are diagrams of a third volume data coupled to the file system, in accordance with some embodiments.
Figure 4A:
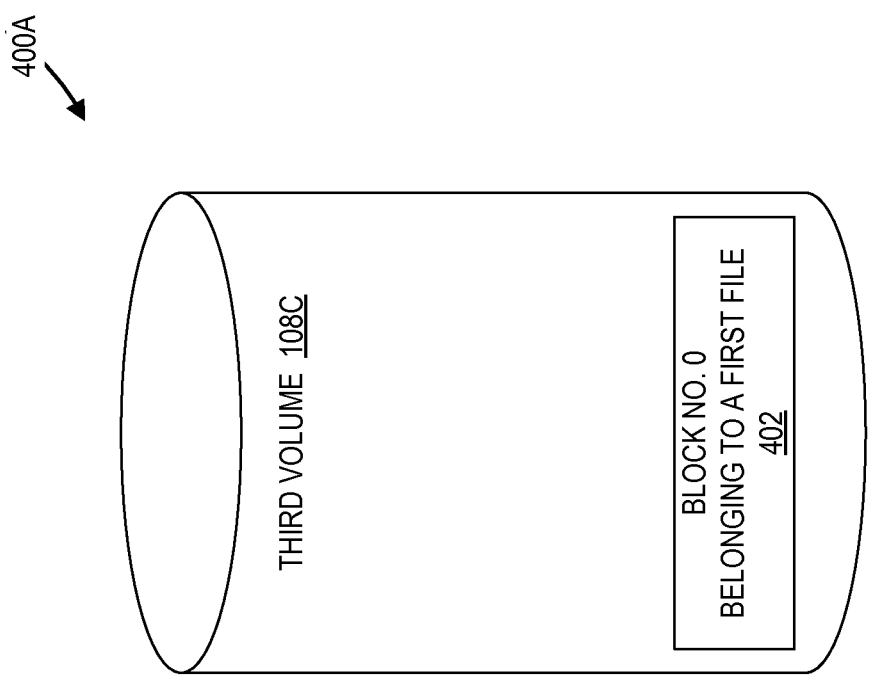

Referring now to FIG. 4A, a diagram 400A shows the third volume 108C after a first file (not shown) has been written to the third volume 108C and a snapshot of the first file has been taken. In an illustrative example, the storage controller 106 writes the first file to the third volume 108C in a block zero 402. The block zero 402 represents a logical block in the third volume 108C. In this example, the first file has a size Z (e.g., in kilobytes) that is equivalent to a given volume block size. The storage controller 106 then takes a snapshot (not shown) of the third volume 108C.

Referring now to FIG. 4B, a diagram 400B shows the third volume 108C after the first file has been deleted and a second file (not shown) has been written to the third volume 108C. Continuing the illustrative example described above with reference to FIG. 3A, a snapshot area 404 includes an image 406 (i.e., a snapshot) of the block zero 402 belonging to the first file. The storage controller 106 deletes the first file. When the second file, which has a size Y that is less than the volume block size, is created, the storage controller 106 performs a read-modify-write operation 408 whereby an amount of data equal to the difference (i.e., Z−Y) between the volume block size and the size of the second file is read from the snapshot area 404. This data that is read from the snapshot area 404 is then written, along with the second file, to the block zero 402. In this example, the read-modify-write operation 408 is unnecessary because the first file has been deleted, and the read-modify-write operation 408 may negatively affect (i.e., slow down) snapshot performance.

Figure 4C:
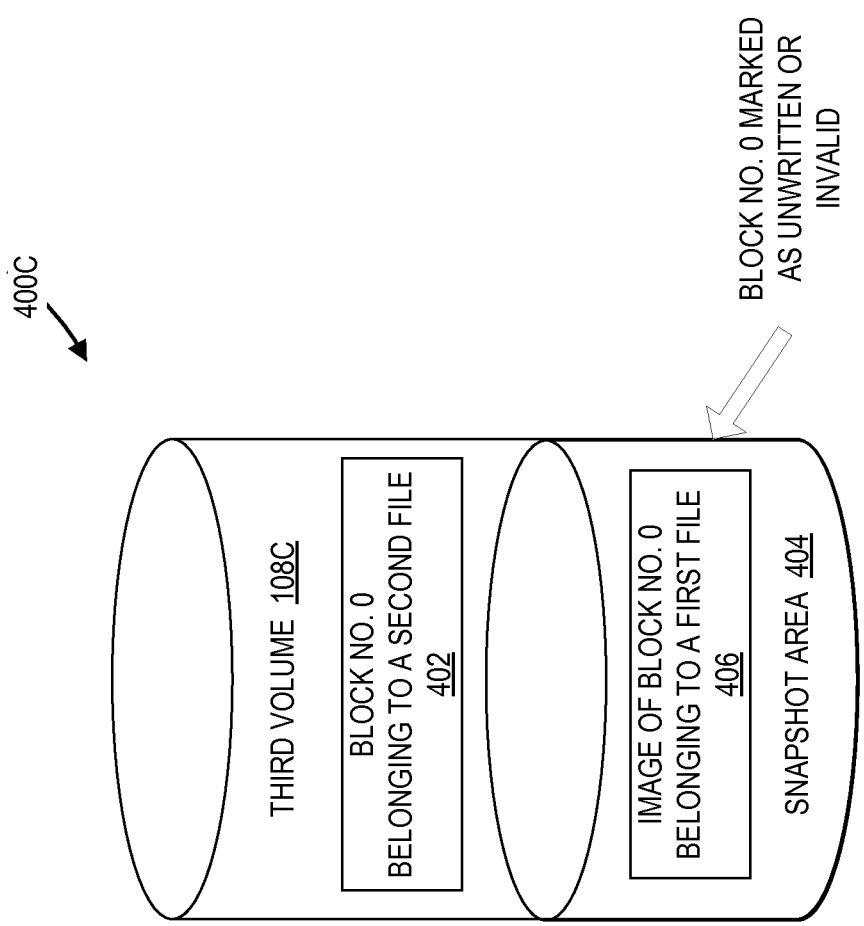

Referring now to FIG. 4C, a diagram 400C shows the third volume 108C after the first file has been deleted and the second file has been written to the third volume 108C. Continuing the illustrative example described above with reference to FIG. 3A, the storage controller 106 deletes the first file. According to some embodiments, when data is being written for the first time to a block in the lifetime of a volume, no read-modify-write is required regardless of the number of snapshots that have been taken. To this end, when the storage controller 106 deletes the first file, the storage controller 106 marks the block zero 402 as unwritten or invalid. For example, the storage controller 106 may identify the first block zero 402 by utilizing the dummy file 208 as described in greater detail above with reference to FIG. 2C. When the second file is created, the storage controller 106 writes the second file to the block zero 402 belonging to the second file without requiring the read-modify-write operation 408.

Figure 5:
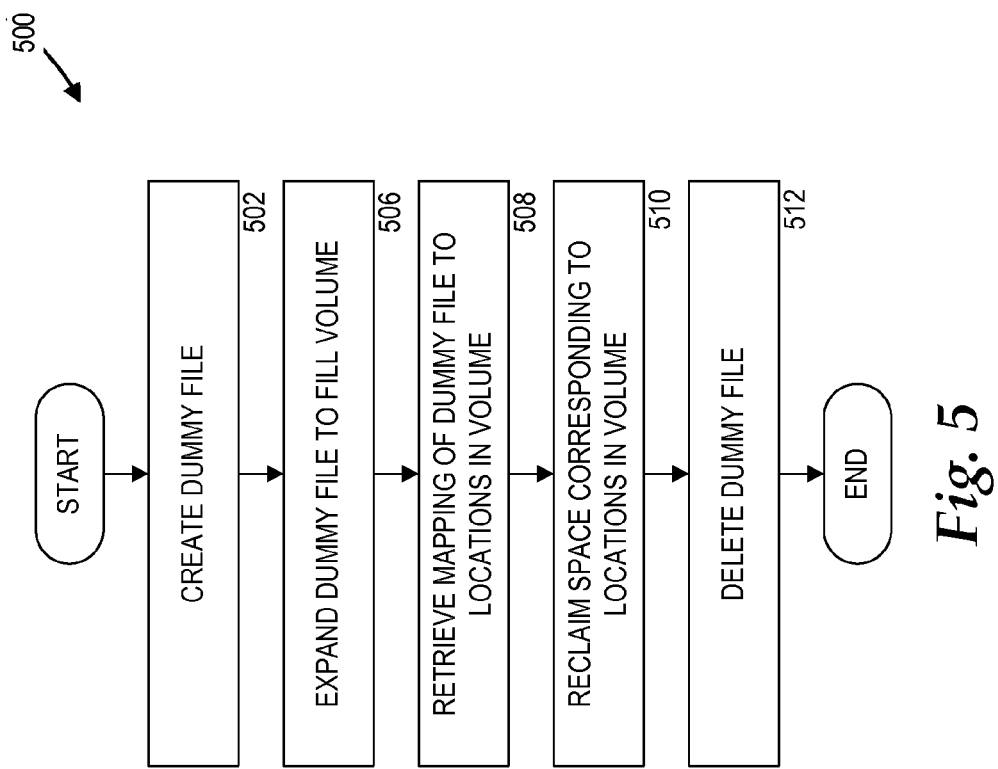
FIG. 5 is a flow diagram showing aspects of a method provided herein for reclaiming space in a file system, in accordance with some embodiments.

Referring now to FIG. 5, additional details will be provided regarding the operation of the storage controller 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 5, a routine 500 begins at operation 502, where the storage controller 106 creates a dummy file, such as the large dummy file 208. The routine 500 then proceeds to operation 506, where the storage controller 106 expands the large dummy file 208 to fill the entire or near the entire volume. For example, the storage controller 106 may reserve space in a volume, such as the thin-provisioned volume 108A, without having to write the large dummy file 208 to the volume. When the storage controller 106 expands the large dummy file 208, the routine 500 proceeds to operation 508.

At operation 508, the storage controller 106 retrieves a mapping of the large dummy file 208 to physical locations in the volume. These physical locations may be utilized to determine the freed space that is occupied by the large dummy file 208. The routine 500 then proceeds to operation 510, where the storage controller 106 reclaims space in the volume including the physical locations corresponding to the mapping of the large dummy file 208. The routine 500 then proceeds to operation 512, where the large dummy file 208 is deleted, thereby freeing up the physical locations previously occupied by the large dummy file 208.

Figure 6:
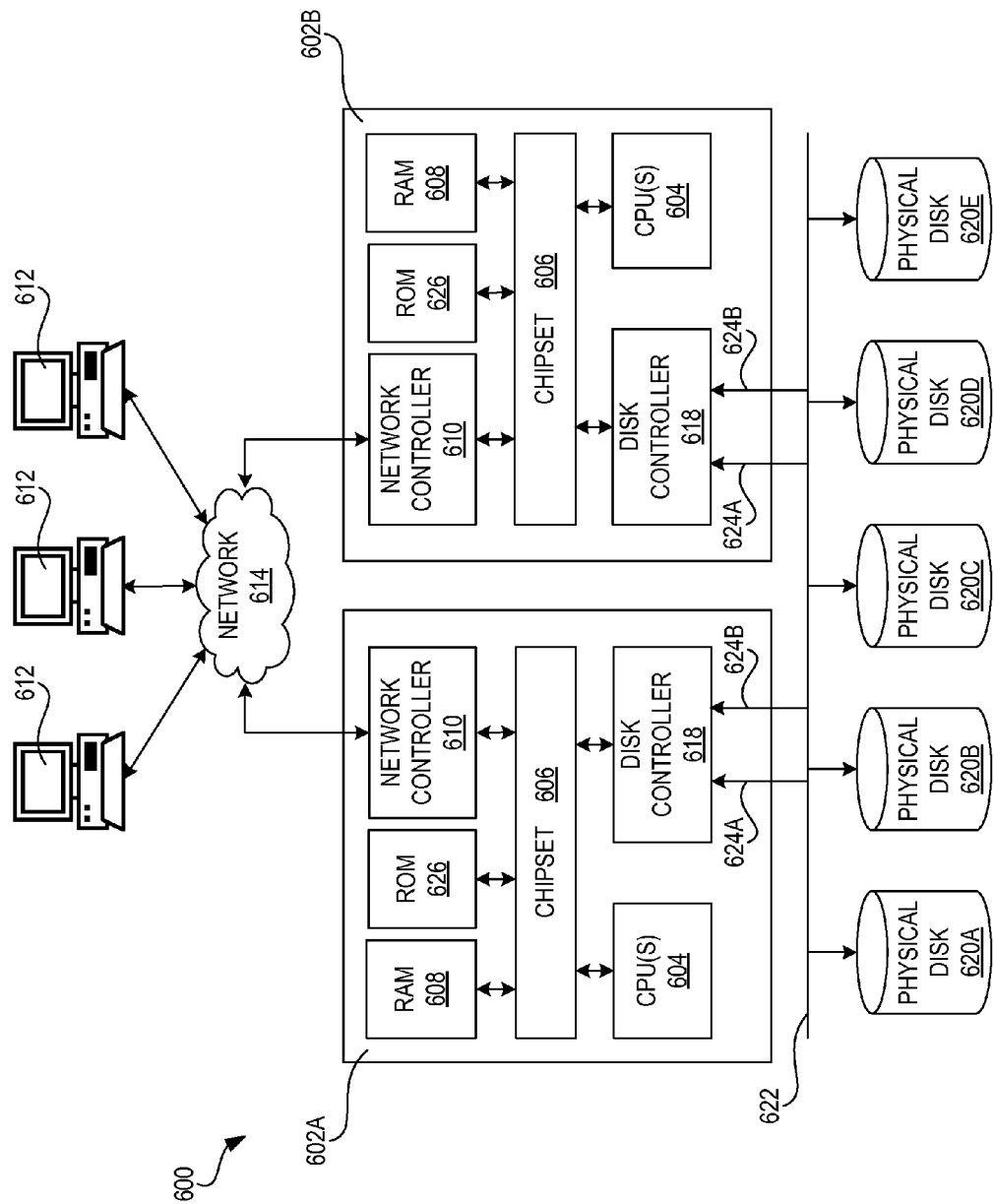
FIG. 6 is a computer architecture diagram showing aspects of an illustrative computer hardware architecture for a computing system capable of implementing aspects of the embodiments presented herein.

FIG. 6 and the following discussion are intended to provide a brief, general description of a suitable computing environment in which the embodiments described herein may be implemented. In particular, FIG. 6 shows an exemplary storage system 600 including two storage computers, or storage controllers 602A, 602B (also referred to herein as storage controller 602). An example of the storage controller 602 includes the storage controller 106. Each storage controller 602 includes a baseboard, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 are standard programmable processors that perform arithmetic and logical operations necessary for the operation of the storage controller 602.

The CPUs 604 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the storage controller 602. The chipset 606 also provides an interface to a random access memory ("RAM") 608 used as the main memory in the storage controller 602. The chipset 606 also includes functionality for providing network connectivity through a network controller 610, such as a gigabit Ethernet adapter. The network controller 610 is capable of connecting the storage controllers 602A, 602B to each other as well as to other client computers 612 acting as initiators of I/O operations over a network 614. The network 614 may be an Ethernet or Gigabyte Ethernet LAN, a fiber ring, a fiber star, wireless, optical, satellite, a WAN, a MAN, or any other network technology, topology, protocol, or combination thereof.

According to embodiments, each storage controller 602A, 602B is connected to a number of physical storage devices, such as physical disks 620A-620E (also referred to herein as physical disks 620) shown in FIG. 6. The physical disks 620 provide the data storage capacity required for the storage controller 602 to store data and service I/O operations initiated by the client computers 612 over the network 614. A disk controller 618 allows the storage controller 602 to communicate with the physical disks 620 connected to the storage controller. According to one embodiment, the disk controller 618 may interface with the physical disks 620 through a serial attached SCSI ("SAS") interface. In other embodiments, the disk controller 618 may interface with the physical disks 620 utilizing a serial advanced technology attachment ("SATA") interface, a fiber channel ("FC") interface, or other standard interface for physically connecting and transferring data between computers and physical storage devices.

According to embodiments, the physical disks 620 may be connected to the storage controller 602 through a bus 622 that allows the disk controller 618 to communicate with the disks. In one embodiment, the physical and electrical structure of the bus 622 may be based upon the storage bridge bay ("SBB") specification. The SBB specification defines mechanical, electrical, and low-level enclosure management requirements for a single enclosure that supports the connection of multiple storage controllers 602 as well as multiple physical disks 620 from a variety of hardware and system vendors. The SBB mid-plane provides the bus 622 that allows multiple storage controllers 602A, 602B to be connected to and communicate with the physical disks 620 concurrently.

In addition, the SBB mid-plane bus 622 provides facilitates for the storage controllers 602A, 602B to communicate with each other via the SAS, SATA, or FC interface implemented on the bus. According to embodiments, the disk controller 618 is capable of utilizing multiple point-to-point communication channels, or ports 624A, 624B, to communicate with other devices over the SBB bus 622. For example, the disk controller 618 may utilize one or more ports 624A to communicate with each physical disk 620 across the bus 622, while utilizing a separate port 624B to communicate across the bus with the other storage controller 602. As will be described in more detail below, the disk controller 618 may only be capable as operating as either an "initiator" or a "target" in regard to each port 624A, 624B, but may be capable of operating as an initiator on one port 624A while simultaneously operating as a target on another port 624B.

The storage controller 602 may store data on the physical disks 620 by transforming the physical state of the disks to reflect the information being stored. The specific transformation of physical state may depend on various factors, in different implementations of this description. Examples of such factors may include, but are not limited to, the technology used to implement the physical disks 620, whether the physical disks are characterized as primary or secondary storage, and the like. For example, the storage controller 602 may store data to the physical disks 620 by issuing instructions to the disk controller 618 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The storage controller 602 may further read information from the physical disks 620 by detecting the physical states or characteristics of one or more particular locations within the devices.

In addition to the physical disks 620 described above, the storage controller 602 may have access to other computer-readable storage medium to store and retrieve information, such as program modules, data structures, or other data. It should be appreciated by those skilled in the art that computer-readable storage media can be any available media that can be accessed by the storage controller 602. By way of example, and not limitation, computer-readable storage media may include volatile and non-volatile, removable and non-removable media implemented in any method or technology. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the storage controller 602.

The computer-readable storage media may store an operating system (not shown) utilized to control the operation of the storage controller 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The computer-readable storage media may store other system or application programs and data utilized by the storage controller 602. In one embodiment, the computer-readable storage medium may be encoded with computer-executable instructions that, when loaded into the storage controller 602, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the storage controller 602 by specifying how the CPUs 604 transitions between states, as described above. According to one embodiment, the storage controller 602 may have access to computer-readable storage media storing computer-executable instructions that, when executed by the computer system, perform the routines for reclaiming space in a file system, as described in greater detail above with reference to FIGS. 1-5.

The chipset 606 may also provide an interface to a computer-readable storage medium such as a ROM 626 or NVRAM for storing a firmware that includes program code containing the basic routines that help to startup the storage controller 602 and to transfer information between elements within the storage controller. The ROM 624 or NVRAM may also store other software components necessary for the operation of the storage controller 602 in accordance with the embodiments described herein. It will be appreciated that the storage controller 602 might not include all of the components shown in FIG. 6, may include other components that are not explicitly shown in FIG. 6, or may utilize an architecture completely different than that shown in FIG. 6.

Based on the foregoing, it should be appreciated that technologies for reclaiming space in a file system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for avoiding unnecessary read-modify-write operations in a storage system, comprising:
    writing a first file having a predetermined block size to a volume in a logical block;
    taking a snapshot of the volume, the snapshot including an image of the logical block;
    deleting the first file from the volume;
    marking the first file as unwritten or invalid; and
    writing a second file having a size less than the predetermined block size to the volume in the logical block, wherein the second file is written without performing a read-modify-write operation on data in the snapshot.

2. The computer-implemented method of claim 1, further comprising identifying the logical block using a temporary dummy file.

3. The computer-implemented method of claim 2, wherein identifying the logical block using a temporary dummy file further comprises:
creating the temporary dummy file;
expanding the temporary dummy file to fill at least a portion of the volume; and
identifying physical regions of the volume occupied by the temporary dummy file, wherein the physical regions include the logical block.

4. The computer-implemented method of claim 3, wherein expanding the temporary dummy file to fill at least a portion of the volume further comprises reserving space for the temporary dummy file in the volume.

5. The computer-implemented method of claim 3, wherein expanding the temporary dummy file to fill at least a portion of the volume further comprises writing the temporary dummy file to the volume.

6. The computer-implemented method of claim 1, wherein the volume is a thin provisioned volume.

7. The computer-implemented method of claim 1, wherein the predetermined block size is a given volume block size determined by the storage system.

8. A non-transitory computer-readable medium having computer-executable instructions stored thereon for avoiding unnecessary read-modify-write operations in a storage system that, when executed by a storage computer, cause the storage computer to:
write a first file having a predetermined block size to a volume in a logical block;
take a snapshot of the volume, the snapshot including an image of the logical block;
delete the first file from the volume;
mark the first file as unwritten or invalid; and
write a second file having a size less than the predetermined block size to the volume in the logical block, wherein the second file is written without performing a read-modify-write operation on data in the snapshot.

9. The non-transitory computer-readable medium of claim 8, having further computer-executable instructions stored thereon that, when executed by the storage computer, cause the storage computer to identify the logical block using a temporary dummy file.

10. The non-transitory computer-readable medium of claim 9, wherein identifying the logical block using a temporary dummy file further comprises:
creating the temporary dummy file;
expanding the temporary dummy file to fill at least a portion of the volume; and
identifying physical regions of the volume occupied by the temporary dummy file, wherein the physical regions include the logical block.

11. The non-transitory computer-readable medium of claim 10, wherein expanding the temporary dummy file to fill at least a portion of the volume further comprises reserving space for the temporary dummy file in the volume.

12. The non-transitory computer-readable medium of claim 10, wherein expanding the temporary dummy file to fill at least a portion of the volume further comprises writing the temporary dummy file to the volume.

13. The non-transitory computer-readable medium of claim 8, wherein the volume is a thin provisioned volume.

14. A computer-implemented method for replicating space reclamation information between a first storage computer and a second storage computer in a storage system, the method comprising:
maintaining a volume with the first storage computer;
maintaining a duplicate of the volume with the second storage computer;
writing a first file having a predetermined block size to the volume in a logical block;
taking a snapshot of the volume, the snapshot including an image of the logical block;
deleting the first file from the volume;
creating a temporary dummy file;
expanding the temporary dummy file to fill at least a portion of the volume;
identifying physical regions of the volume occupied by the temporary dummy file, wherein the physical regions include the logical block;
marking the first file as unwritten or invalid in the volume;
transmitting the identified physical regions including the logical block from the first storage computer to the second storage computer; and
writing a second file having a size less than the predetermined block size to the volume in the logical block, wherein the second file is written without performing a read-modify-write operation on data in the snapshot.

15. The computer-implemented method of claim 14, further comprising:
receiving the identified physical regions including the logical block from the first storage computer at the second storage computer;
marking the first file as unwritten or invalid in the duplicate of the volume; and
writing the second file having the size less than the predetermined block size to the duplicate of the volume in the logical block, wherein the second file is written without performing a read-modify-write operation on snapshot data.

16. The computer-implemented method of claim 14, further comprising freeing the identified physical regions including the logical block in the duplicate of the volume for use by other volumes.

17. The computer-implemented method of claim 14, wherein expanding the temporary dummy file to fill at least a portion of the volume further comprises reserving space for the temporary dummy file in the volume or writing the temporary dummy file to the volume.

18. A non-transitory computer-readable medium having computer-executable instructions stored thereon for replicating space reclamation information between a first storage computer and a second storage computer in a storage system that, when executed by the first storage computer, cause the first storage computer to:
maintain a volume;
write a first file having a predetermined block size to the volume in a logical block;
take a snapshot of the volume, the snapshot including an image of the logical block;
delete the first file from the volume;
create a temporary dummy file;
expand the temporary dummy file to fill at least a portion of the volume;
identify physical regions of the volume occupied by the temporary dummy file, wherein the physical regions include the logical block;
mark the first file as unwritten or invalid in the volume;

communicate the identified physical regions including the logical block from the first storage computer to the second storage computer; and write a second file having a size less than the predetermined block size to the volume in the logical block, wherein the second file is written without performing a read-modify-write operation on data in the snapshot.

19. The non-transitory computer-readable medium of claim 18, having further computer-executable instructions stored thereon that, when executed by the second storage computer, cause the second storage computer to:

maintain a duplicate of the volume;

receive the identified physical regions including the logical block from the first storage computer at the second storage computer;

mark the first file as unwritten or invalid in the duplicate of the volume; and write the second file having the size less than the predetermined block size to the duplicate of the volume in the logical block, wherein the second file is written without performing a read-modify-write operation on snapshot data.

20. The non-transitory computer-readable medium of claim 18, having further computer-executable instructions stored thereon that, when executed by the second storage computer, cause the second storage computer to free the identified physical regions including the logical block in the duplicate of the volume for use by other volumes.

* * * * *